US012587503B2

(12) United States Patent
Veeriah et al.

(10) Patent No.: US 12,587,503 B2
(45) Date of Patent: Mar. 24, 2026

(54) SYSTEM AND METHOD FOR PROVIDING PEER-TO-PEER VIRTUAL PRIVATE NETWORK CONNECTIONS IN MULTI-GATEWAY ENTERPRISE NETWORKS

(71) Applicant: Privafy Inc, Burlington, MA (US)

(72) Inventors: Vijay Sankar Veeriah, Bangalore (IN); Srinivasan Krishnamoorthy, Bangalore (IN); Bala Srinivasa Lalith Kumar Sesham, Bangalore (IN); Srinivas Shetti, Bangalore (IN); Rajkumar Kanniappan, Bangalore (IN)

(73) Assignee: Privafy Inc

( * ) Notice: Subject to any disclaimer, the term of this patent is extended or adjusted under 35 U.S.C. 154(b) by 56 days.

(21) Appl. No.: 18/912,666

(22) Filed: Oct. 11, 2024

(65) Prior Publication Data

US 2025/0126098 A1 Apr. 17, 2025

Related U.S. Application Data

(60) Provisional application No. 63/590,001, filed on Oct. 13, 2023.

(51) Int. Cl.
| | |
|---|---|
| *H04L 29/06* | (2006.01) |
| *H04L 9/40* | (2022.01) |
| *H04L 61/5007* | (2022.01) |

(52) U.S. Cl.
CPC ...... *H04L 63/0272* (2013.01); *H04L 61/5007* (2022.05)

(58) Field of Classification Search
None
See application file for complete search history.

(56) References Cited

U.S. PATENT DOCUMENTS

| | | | |
|---|---|---|---|
| 8,595,365 B2 | 11/2013 | Scott et al. | |
| 9,565,277 B2 * | 2/2017 | Visser | H04L 12/4641 |
| 10,455,387 B2 * | 10/2019 | Nicholson | H04L 12/4641 |
| 11,388,227 B1 * | 7/2022 | Sun | H04L 45/64 |
| 11,949,656 B2 | 4/2024 | Sole et al. | |

(Continued)

*Primary Examiner* — Maung T Lwin
(74) *Attorney, Agent, or Firm* — Jason C. Cameron

(57) ABSTRACT

A system and a method for providing peer-to-peer virtual private network (VPN) connections in multi-gateway enterprise networks are disclosed. The system comprises a cloud interaction subsystem, a profile generation subsystem, a network traffic framework subsystem, and a tunnel proxy subsystem. The cloud interaction subsystem obtains at least one of: routing data and one or more encryption keys from the multi-gateway enterprise networks to store in one or more databases. The profile generation subsystem generates a VPN profile for each user of one or more users to connect with an associated enterprise network within the multi-gateway enterprise networks. The network traffic framework subsystem encapsulates and decapsulates outgoing network traffic data and incoming network traffic data respectively. The tunnel proxy subsystem multiplexes and de-multiplexes the outgoing network traffic data and the incoming network traffic data to provide peer-to-peer VPN connections in the multi-gateway enterprise networks with a single VPN profile.

20 Claims, 7 Drawing Sheets

400

Obtain, by one or more hardware processors through a cloud interaction subsystem, at least one of: routing data and one or more encryption keys from the multi-gateway enterprise networks to store in one or more databases 402

Generate, by the one or more hardware processors through a profile generation subsystem, a virtual private network (VPN) profile comprises a local internet protocol (IP) address for each user of one or more users to connect with an associated enterprise network within the multi-gateway enterprise networks 404

Perform, by the one or more hardware processors through a network traffic framework subsystem, one of: encapsulating outgoing network traffic data obtained from the generated virtual private network (VPN) profile; decapsulating incoming network traffic data received from the associated enterprise network within the multi-gateway enterprise networks 406

Multiplex, by the one or more hardware processors through a tunnel proxy subsystem, the encapsulated outgoing network traffic data based on at least one of: a security parameter index (SPI) of the encapsulated outgoing network traffic data, and at least one of: the routing data and the one or more encryption keys, for routing the outgoing network traffic data to the associated enterprise network within the multi-gateway enterprise networks 408

Encrypt, by the one or more hardware processors through the tunnel proxy subsystem, the multiplexed outgoing network traffic data with an apposite encryption key within the one or more encryption keys to determine the associated enterprise network within the multi-gateway enterprise networks for routing the outgoing network traffic data from the virtual private network (VPN) profile 410

A

400

A

De-multiplex, by the one or more hardware processors through the tunnel proxy subsystem, the received incoming network traffic data from the associated enterprise network within the multi-gateway enterprise networks based on at least one of: the security parameter index (SPI) of the incoming network traffic data and at least one of: the routing data and the one or more encryption keys for routing the incoming network traffic data to the network traffic framework subsystem for decapsulating 412

Decrypt, by the one or more hardware processors through the tunnel proxy subsystem, the incoming network traffic data with the apposite encryption key within the one or more encryption keys to de-multiplex the received incoming network traffic data for identifying the virtual private network (VPN) profile of an associated user within the one or more users 414

Provide, by the one or more hardware processors through the tunnel proxy subsystem, the peer-to-peer virtual private network (VPN) connections in the multi-gateway enterprise networks based on encrypting and decrypting the outgoing network traffic data and the incoming network traffic data respectively using at least one of: the routing data and the one or more encryption keys 416

(56)  References Cited

U.S. PATENT DOCUMENTS

| | | | | |
|---|---|---|---|---|
| 2007/0198837 A1* | 8/2007 | Koodli | ............. | H04W 12/0471 |
| | | | | 713/153 |
| 2009/0199290 A1* | 8/2009 | McCullough | ....... | H04L 63/0485 |
| | | | | 726/12 |
| 2010/0154028 A1* | 6/2010 | Wainner | ............. | H04L 63/0428 |
| | | | | 726/1 |
| 2022/0337545 A1* | 10/2022 | Liu | ..................... | H04L 12/4641 |
| 2022/0368675 A1* | 11/2022 | Narula | ................. | H04L 63/166 |
| 2022/0385638 A1 | 12/2022 | Chen | | |

* cited by examiner

100

200

300A

400

Obtain, by one or more hardware processors through a cloud interaction subsystem, at least one of: routing data and one or more encryption keys from the multi-gateway enterprise networks to store in one or more databases 402

Generate, by the one or more hardware processors through a profile generation subsystem, a virtual private network (VPN) profile comprises a local internet protocol (IP) address for each user of one or more users to connect with an associated enterprise network within the multi-gateway enterprise networks 404

Perform, by the one or more hardware processors through a network traffic framework subsystem, one of: encapsulating outgoing network traffic data obtained from the generated virtual private network (VPN) profile; decapsulating incoming network traffic data received from the associated enterprise network within the multi-gateway enterprise networks 406

Multiplex, by the one or more hardware processors through a tunnel proxy subsystem, the encapsulated outgoing network traffic data based on at least one of: a security parameter index (SPI) of the encapsulated outgoing network traffic data, and at least one of: the routing data and the one or more encryption keys, for routing the outgoing network traffic data to the associated enterprise network within the multi-gateway enterprise networks 408

Encrypt, by the one or more hardware processors through the tunnel proxy subsystem, the multiplexed outgoing network traffic data with an apposite encryption key within the one or more encryption keys to determine the associated enterprise network within the multi-gateway enterprise networks for routing the outgoing network traffic data from the virtual private network (VPN) profile 410

Figure 4
(Continued)

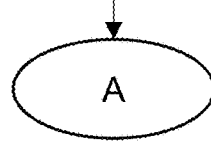

A

400

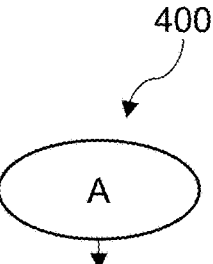

A

De-multiplex, by the one or more hardware processors through the tunnel proxy subsystem, the received incoming network traffic data from the associated enterprise network within the multi-gateway enterprise networks based on at least one of: the security parameter index (SPI) of the incoming network traffic data and at least one of: the routing data and the one or more encryption keys for routing the incoming network traffic data to the network traffic framework subsystem for decapsulating 412

Decrypt, by the one or more hardware processors through the tunnel proxy subsystem, the incoming network traffic data with the apposite encryption key within the one or more encryption keys to de-multiplex the received incoming network traffic data for identifying the virtual private network (VPN) profile of an associated user within the one or more users 414

Provide, by the one or more hardware processors through the tunnel proxy subsystem, the peer-to-peer virtual private network (VPN) connections in the multi-gateway enterprise networks based on encrypting and decrypting the outgoing network traffic data and the incoming network traffic data respectively using at least one of: the routing data and the one or more encryption keys 416

SYSTEM AND METHOD FOR PROVIDING PEER-TO-PEER VIRTUAL PRIVATE NETWORK CONNECTIONS IN MULTI-GATEWAY ENTERPRISE NETWORKS

EARLIEST PRIORITY DATE

This Application claims priority from a Provisional patent application filed in the United States of America having Patent Application No. 63/590,001, on Oct. 13, 2023, and titled "SYSTEM AND METHOD FOR PEER-TO-PEER VIRTUAL PRIVATE NETWORK CONNECTIONS IN AMULTI-GATEWAY ENVIRONMENT".

TECHNICAL FIELD

Embodiments of the present disclosure relate to virtual private networks (VPN) and more particularly relate to a computer-implemented system and a computer-implemented method for providing peer-to-peer virtual private network (VPN) connections in multi-gateway enterprise networks.

BACKGROUND

A virtual private network (VPN) is a technology that permits a secure and encrypted connection over an Internet. The VPN provides privacy and security by creating a private network from a public internet connection, effectively shielding online activities of a user of one or more users from prying eyes such as hackers, third-party agents, and the like. One or more communication devices create one or more virtual private network (VPN) profiles to create a secure, encrypted connection between the one or more communication devices (such as the personal computers and mobile devices) and one or more servers, which acts as a gateway to the Internet. The one or more servers are located anywhere in world. The one or more VPN profiles are customized to include key exchange, derivation, and encryption methods specific to a desired application. However, each VPN profile of the one or more VPN profiles is only associated with a single server destination internet protocol (IP) address.

Traditionally, an enterprise network environment 100 with a plurality of gateway servers 102a-102c as depicted in FIG. 1, the user needs to manually switch the one or more VPN profiles in a client device 104 to connect to the one or more servers in different locations, depending on specific needs for better performance or direct connectivity. If the user does not switch the one or more VPN profiles, traffic from the client device 104 to other locations of the plurality of gateway servers 102a-102c are routed through a central Virtual Private Network (VPN) gateway and then redirected within an enterprise to reach the desired destination location via the other site-to-site plurality of gateway servers 102a-102c. This process is inefficient, involving multiple hops, decryption, and re-encryption lacks peer-to-peer communication. Routing all the traffic through the central VPN gateway and then redirecting the traffic to the intended destination location adds unnecessary hops and introduces latency. This results in slower performance and increased network congestion. Concentrating all the traffic through the central VPN gateway puts a heavier load on that specific gateway, leading to potential performance bottlenecks and decreased overall network efficiency. Traffic routed through the central VPN gateway needs to be decrypted and then re-encrypted for redirection to the destination location. This additional encryption and decryption process consumes processing power and may introduce potential security vulnerabilities. By routing all the traffic through the central VPN gateway, direct connectivity between the client devices 104 and the desired destination location is lost.

In the existing technology, a network traffic inspection system is disclosed. The network traffic inspection system comprises a first application running on the client device. The first application is configured to generate a first Internet Protocol (IP) packet via a first IP stack on the client device. The first IP packet is to be transmitted to an external computer system. The network traffic inspection system further comprises a second application running on the client device. The second application is configured to create a virtual private network (VPN) stack that starts and ends at the client device. The second application is configured to intercept the first IP packet, via the created VPN stack, before the first IP packet is transmitted from the client device to analyze network traffic for potential security threat. The second application is configured to generate a second IP packet via a second IP stack on the client device. The second IP packet is generated as a response to the first IP packet and in response to determining potential security threat associated with the network traffic. The second application is configured to provide the second IP packet to the first application as the response to the first IP packet. Nevertheless, the network traffic inspection system requires intercepting, analyzing, and synthesizing IP packets. This additional processing may introduce delays, especially in real-time applications that depend on low-latency communication.

There are various technical problems with the one or more VPN profiles in the prior art. In the existing technology, managing multiple VPN profiles have become complex, especially for the one or more end-users. The user needs to manually switch between the one or more VPN profiles, remember different server destinations, and configure settings for each VPN profile. Each VPN profile of the one or more VPN profiles adds the encryption, the decryption, and an encapsulation overhead. When the traffic needs to traverse multiple virtual private networks (VPNs) connections, the traffic requires repeated encryption and decryption processes, which increases computational load and potentially degrades performance.

Therefore, there is a need for a system and a method to address and overcome the aforementioned issues and provide peer-to-peer VPN connections in a multi-gateway environment by ensuring privacy, security, and optimal performance for the one or more users.

SUMMARY

This summary is provided to introduce a selection of concepts, in a simple manner, which is further described in the detailed description of the disclosure. This summary is neither intended to identify key or essential inventive concepts of the subject matter nor to determine the scope of the disclosure.

In accordance with an embodiment of the present disclosure, a computer-implemented method for providing peer-to-peer virtual private network (VPN) connections in multi-gateway enterprise networks is disclosed. In the first step, the computer-implemented method includes obtaining, by one or more hardware processors through a cloud interaction subsystem, at least one of: routing data and one or more encryption keys from the multi-gateway enterprise networks to store in one or more databases. The routing data comprises at least one of: gateway configurations, network traffic routing data, internet protocol (IP) addresses, protocol type, time of day, and traffic data type.

In the next step, the computer-implemented method includes generating, by the one or more hardware processors through a profile generation subsystem, a VPN profile comprises a local internet protocol (IP) address for each user of one or more users to connect with an associated enterprise network within the multi-gateway enterprise networks. The computer-implemented method includes updating, by the one or more hardware processors through the profile generation subsystem, the local IP address in real-time based on at least one of: a user location and an availability of the associated enterprise network within the multi-gateway enterprise networks, for routing one of: the outgoing network traffic data and the incoming network traffic data.

In the next step, the computer-implemented method includes performing, by the one or more hardware processors through a network traffic framework subsystem, one of: a) encapsulating outgoing network traffic data obtained from the generated VPN profile; b) transmitting the encapsulated outgoing network traffic data to the associated enterprise network within the multi-gateway enterprise networks; c) decapsulating incoming network traffic data received from the associated enterprise network within the multi-gateway enterprise networks; and d) transmitting the decapsulated incoming network traffic data to the VPN profile. The network traffic framework subsystem comprises an egress handler module and an ingress handler module.

In an embodiment, the egress handler module is operatively connected to an encapsulation callback module. The encapsulation callback module is configured to encapsulate the outgoing network traffic data associated with the VPN profile using Internet Protocol Security (IPSEC) containing at least one of: source ports, destination ports, sequence numbers, source IP address, destination IP address, and media access control (MAC) Address. The egress handler module is configured to update User Datagram Protocol (UDP) encapsulation Security Parameter Index (SPID) protocol header fields associated with the outgoing network traffic data based on at least one of: the routing data and the one or more encryption keys for encapsulating the outgoing network traffic data. The ingress handler module is operatively connected to a decapsulate callback module. The decapsulate callback module is configured to decapsulate the incoming network traffic data received from a tunnel proxy subsystem and transmit to the VPN profile of an associated user within the one or more users.

In the next step, the computer-implemented method includes multiplexing, by the one or more hardware processors through the tunnel proxy subsystem, the encapsulated outgoing network traffic data based on at least one of: a security parameter index (SPI) of the encapsulated outgoing network traffic data, and at least one of: the routing data and the one or more encryption keys, for routing the outgoing network traffic data to the associated enterprise network within the multi-gateway enterprise networks. In the next step, the computer-implemented method includes encrypting, by the one or more hardware processors through the tunnel proxy subsystem, the multiplexed outgoing network traffic data with an apposite encryption key within the one or more encryption keys to determine the associated enterprise network within the multi-gateway enterprise networks for routing the outgoing network traffic data from the VPN profile.

In the next step, the computer-implemented method includes de-multiplexing, by the one or more hardware processors through the tunnel proxy subsystem, the received incoming network traffic data from the associated enterprise network within the multi-gateway enterprise networks based on at least one of: the SPI of the incoming network traffic data and at least one of: the routing data and the one or more encryption keys for routing the incoming network traffic data to the network traffic framework subsystem for decapsulating. In the next step, the computer-implemented method includes decrypting, by the one or more hardware processors through the tunnel proxy subsystem, the incoming network traffic data with the apposite encryption key within the one or more encryption keys to de-multiplex the received incoming network traffic data for identifying the VPN profile of the associated user within the one or more users.

In an embodiment, the tunnel proxy subsystem comprises an egress processing module, and an ingress processing module. The egress processing module is configured to map the encapsulated outgoing network traffic data to the associated enterprise network within the multi-gateway enterprise networks using a corresponding User Datagram Protocol (UDP) socket based on at least one of: the routing data and the one or more encryption keys. The ingress processing module is configured to map the incoming network traffic data from the multi-gateway enterprise networks to the VPN profile of the associated user within the one or more users based on at least one of: the corresponding UDP socket associated with the associated enterprise network within the multi-gateway enterprise networks, and the UDP encapsulation SPID protocol header fields.

In the next step, the computer-implemented method includes providing, by the one or more hardware processors through the tunnel proxy subsystem, the peer-to-peer virtual private network (VPN) connections in the multi-gateway enterprise networks based on encrypting and decrypting the outgoing network traffic data and the incoming network traffic data respectively using at least one of: the routing data and the one or more encryption keys.

According to another exemplary embodiment of the present disclosure, a computer-implemented system for providing the peer-to-peer virtual private network (VPN) connections in the multi-gateway enterprise networks is disclosed. The computer-implemented system comprises the one or more hardware processors and a memory unit. The memory unit is operatively connected to the one or more hardware processors. The memory unit comprises a set of computer-readable instructions in form of a plurality of subsystems. The plurality of subsystems configured to be executed by the one or more hardware processors. The plurality of subsystems comprises the cloud interaction subsystem, the profile generation subsystem, the network traffic framework subsystem, and the tunnel proxy subsystem.

In an embodiment, the cloud interaction subsystem is configured to obtain at least one of: the routing data and the one or more encryption keys from the multi-gateway enterprise networks. The cloud interaction subsystem is configured to store the obtained at least one of: the routing data and the one or more encryption keys in the one or more databases for communicating with the associated enterprise network within the multi-gateway enterprise networks. The cloud interaction subsystem is configured to dynamically update the stored at least one of: the routing data and the one or more encryption keys based on changes in the multi-gateway enterprise networks.

Yet another embodiment, the profile generation subsystem is configured to generate the VPN profile comprises the IP address for each user of one or more users to connect with the associated enterprise network within the multi-gateway enterprise networks. In another embodiment, the network traffic framework subsystem is configured to encapsulate outgoing network traffic data obtained from the generated VPN profile and transmit the encapsulated the outgoing network traffic data to the associated enterprise network within the multi-gateway enterprise networks. The network traffic framework subsystem is configured to decapsulate the incoming network traffic data received from the associated enterprise network within the multi-gateway enterprise networks and transmit the decapsulated incoming network traffic data to the VPN profile.

In an embodiment, the tunnel proxy subsystem is operatively connected to the cloud interaction subsystem and the network traffic framework subsystem. The tunnel proxy subsystem is configured to multiplex the encapsulated outgoing network traffic data. The multiplexing of the outgoing network traffic data is based on at least one of: the SPI of the encapsulated outgoing network traffic data, and at least one of: the routing data and the one or more encryption keys, for routing the outgoing network traffic data to the associated enterprise network within the multi-gateway enterprise networks. The tunnel proxy subsystem is configured to encrypt the multiplexed outgoing network traffic data with the apposite encryption key within the one or more encryption keys to determine the associated enterprise network within the multi-gateway enterprise networks for routing the outgoing network traffic data from the VPN profile.

Yet another embodiment, the tunnel proxy subsystem is configured to de-multiplex the received incoming network traffic data from the associated enterprise network within the multi-gateway enterprise networks based on at least one of: the SPI of the incoming network traffic data and at least one of: the routing data and the one or more encryption keys for routing the incoming network traffic data to the network traffic framework subsystem for decapsulating. The tunnel proxy subsystem is configured to decrypt the incoming network traffic data with the apposite encryption key within the one or more encryption keys to de-multiplex the received incoming network traffic data for identifying the VPN profile of an associated user within the one or more users. The tunnel proxy subsystem is configured to provide the peer-to-peer VPN connections in the multi-gateway enterprise networks based on encrypting and decrypting the outgoing network traffic data and the incoming network traffic data respectively using at least one of: the routing data and the one or more encryption keys.

According to another exemplary embodiment of the present disclosure, a non-transitory computer-readable storage medium storing computer-executable instructions that, when executed by the one or more hardware processors, cause the one or more hardware processors to perform operations for providing the peer-to-peer VPN connections in the multi-gateway enterprise networks, the operations comprising: a) obtaining at least one of: the routing data and the one or more encryption keys from the multi-gateway enterprise networks to store in the one or more databases; b) generating the VPN profile comprises the local IP address for each user of one or more users to connect with the associated enterprise network within the multi-gateway enterprise networks; c) performing one of: encapsulating the outgoing network traffic data obtained from the generated VPN profile; transmitting the encapsulated outgoing network traffic data to the associated enterprise network within the multi-gateway enterprise networks; decapsulating the incoming network traffic data received from the associated enterprise network within the multi-gateway enterprise networks; transmitting the decapsulated incoming network traffic data to the VPN profile; d) multiplexing the encapsulated outgoing network traffic data based on at least one of: the SPI of the encapsulated outgoing network traffic data, and at least one of: the routing data and the one or more encryption keys, for routing the outgoing network traffic data to the associated enterprise network within the multi-gateway enterprise networks; e) encrypting the multiplexed outgoing network traffic data with the apposite encryption key within the one or more encryption keys to determine the associated enterprise network within the multi-gateway enterprise networks for routing the outgoing network traffic data from the VPN profile; f) de-multiplexing the received incoming network traffic data from the associated enterprise network within the multi-gateway enterprise networks based on at least one of: the SPI of the incoming network traffic data and at least one of: the routing data and the one or more encryption keys for routing the incoming network traffic data to the network traffic framework subsystem for decapsulating; g) decrypting the incoming network traffic data with the apposite encryption key within the one or more encryption keys to de-multiplex the received incoming network traffic data for identifying the VPN profile of the associated user within the one or more users; and h) providing the peer-to-peer VPN connections in the multi-gateway enterprise networks based on encrypting and decrypting the outgoing network traffic data and the incoming network traffic data respectively using at least one of: the routing data and the one or more encryption keys.

To further clarify the advantages and features of the present disclosure, a more particular description of the disclosure will follow by reference to specific embodiments thereof, which are illustrated in the appended figures. It is to be appreciated that these figures depict only typical embodiments of the disclosure and are therefore not to be considered limiting in scope. The disclosure will be described and explained with additional specificity and detail with the appended figures.

BRIEF DESCRIPTION OF DRAWINGS

The disclosure will be described and explained with additional specificity and detail with the accompanying figures in which:

FIG. 4 illustrates an exemplary flow chart of a computer-implemented method for providing the peer-to-peer VPN connections in the multi-gateway enterprise networks, in accordance with an embodiment of the present disclosure.

Figure 1:
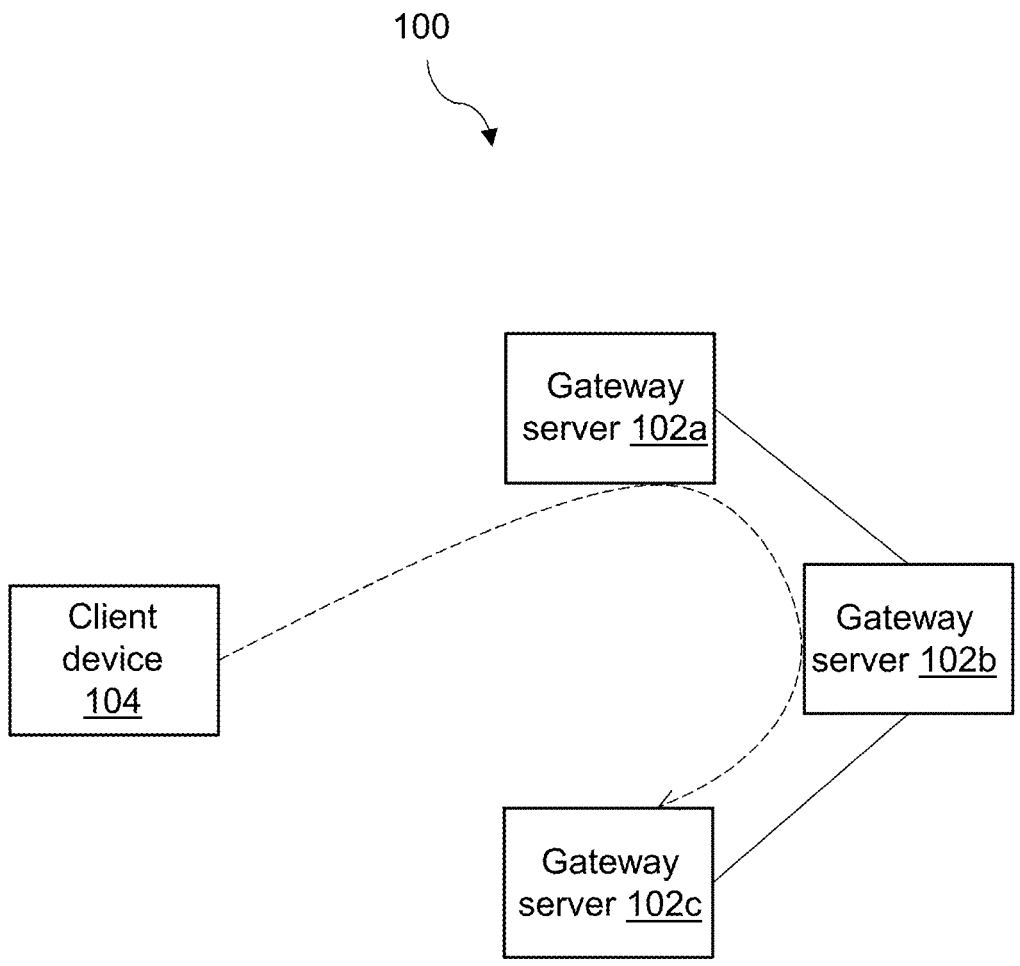
FIG. 1 illustrates an exemplary enterprise network environment with a plurality of gateway servers, in accordance with an embodiment of prior art.

Further, those skilled in the art will appreciate that elements in the figures are illustrated for simplicity and may not have necessarily been drawn to scale. Furthermore, in terms of the construction of the device, one or more components of the device may have been represented in the figures by conventional symbols, and the figures may show only those specific details that are pertinent to understanding the embodiments of the present disclosure so as not to obscure the figures with details that will be readily apparent to those skilled in the art having the benefit of the description herein.

DETAILED DESCRIPTION OF THE DISCLOSURE

For the purpose of promoting an understanding of the principles of the disclosure, reference will now be made to the embodiment illustrated in the figures and specific language will be used to describe them. It will nevertheless be understood that no limitation of the scope of the disclosure is thereby intended. Such alterations and further modifications in the illustrated system, and such further applications of the principles of the disclosure as would normally occur to those skilled in the art are to be construed as being within the scope of the present disclosure. It will be understood by those skilled in the art that the foregoing general description and the following detailed description are exemplary and explanatory of the disclosure and are not intended to be restrictive thereof.

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

The terms "comprise", "comprising", or any other variations thereof, are intended to cover a non-exclusive inclusion, such that one or more devices or sub-systems or elements or structures or components preceded by "comprises . . . a" does not, without more constraints, preclude the existence of other devices, sub-systems, additional sub-modules. Appearances of the phrase "in an embodiment", "in another embodiment" and similar language throughout this specification may, but not necessarily do, all refer to the same embodiment.

Unless otherwise defined, all technical and scientific terms used herein have the same meaning as commonly understood by those skilled in the art to which this disclosure belongs. The system, methods, and examples provided herein are only illustrative and not intended to be limiting.

A computer system (standalone, client or server computer system) configured by an application may constitute a "module" (or "subsystem") that is configured and operated to perform certain operations. In one embodiment, the "module" or "subsystem" may be implemented mechanically or electronically, so a module include dedicated circuitry or logic that is permanently configured (within a special-purpose processor) to perform certain operations. In another embodiment, a "module" or "subsystem" may also comprise programmable logic or circuitry (as encompassed within a general-purpose processor or other programmable processor) that is temporarily configured by software to perform certain operations.

Accordingly, the term "module" or "subsystem" should be understood to encompass a tangible entity, be that an entity that is physically constructed permanently configured (hardwired) or temporarily configured (programmed) to operate in a certain manner and/or to perform certain operations described herein.

Referring now to the drawings, and more particularly to FIG. 2 through FIG. 5, where similar reference characters denote corresponding features consistently throughout the figures, there are shown preferred embodiments, and these embodiments are described in the context of the following exemplary system and/or method.

Figure 2:
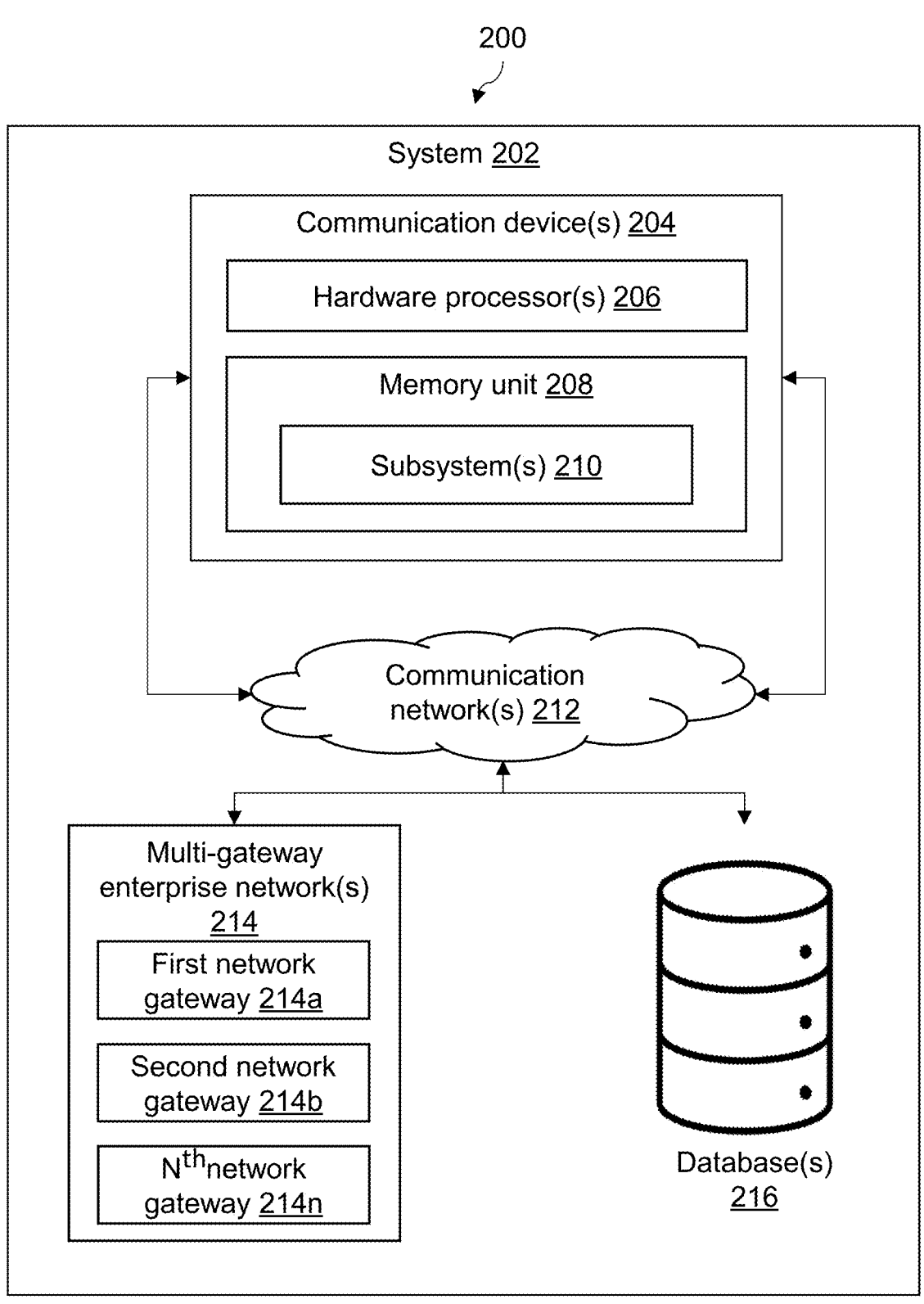
FIG. 2 illustrates an exemplary block diagram representation of a network architecture depicting a computer-implemented system for providing peer-to-peer virtual private network (VPN) connections in multi-gateway enterprise networks, in accordance with an embodiment of the present disclosure.

FIG. 2 illustrates an exemplary block diagram representation of a network architecture 200 depicting a computer-implemented system 202 for providing peer-to-peer virtual private network (VPN) connections in multi-gateway enterprise networks 214, in accordance with an embodiment of the present disclosure.

According to an exemplary embodiment of the present disclosure, the network architecture 200 may include the computer-implemented system 202, one or more communication devices 204, one or more databases 216, and the multi-gateway enterprise networks 214. The computer-implemented system 202 is configured within the one or more communication devices 204 and operatively connected to the one or more databases 216 and the multi-gateway enterprise networks 214 via one or more communication networks 212, ensuring seamless data transmission, processing, optimal connection, and reduced latency. The computer-implemented system 202 acts as the central processing unit within the network architecture 200, responsible for providing the peer-to-peer VPN connections in the multi-gateway enterprise networks 214 by avoiding a central anchor gateway. The computer-implemented system 202 is configured to execute a set of computer-readable instructions that control a plurality of subsystems 210, providing the VPN connections which use custom key exchange or derivation mechanisms and achieving the peer-to-peer connections in the multi-gateway enterprise networks 214.

In an exemplary embodiment, the one or more communication devices 204 are configured to enable one or more end users to interact with the computer-implemented system 202 and the multi-gateway enterprise networks 214. The one or more communication devices 204 may be digital devices, computing devices, and/or networks. The one or more communication devices 204 may include, but not limited to, a mobile device, a smartphone, a personal digital assistant (PDA), a tablet computer, a phablet computer, a wearable computing device, a virtual reality/augmented reality (VR/AR) device, a laptop, a desktop, and the like.

In an exemplary embodiment, the one or more communication devices 204 may be associated with, but not limited to, one or more service providers, one or more customers, an individual, an administrator, a vendor, a technician, a specialist, an instructor, a supervisor, a team, an entity, an organization, a company, a facility, a bot, any other user, and combination thereof. The entity, the organization, and the facility may include, but not limited to, an e-commerce company, online marketplaces, service providers, retail stores, a merchant organization, a logistics company, warehouses, transportation company, an airline company, a hotel booking company, a hospital, a healthcare facility, an exercise facility, a laboratory facility, a company, an outlet, a manufacturing unit, an enterprise, an organization, an educational institution, a secured facility, a warehouse facility, a supply chain facility, any other facility/organization and the like.

The multi-gateway enterprise networks 214 comprise multiple network gateways (214a, 214b, . . . , 214n) strategically distributed across various geographic locations within an enterprise infrastructure. The network gateways (214a, 214b, . . . 214n) facilitate secure peer-to-peer VPN connections, allowing the one or more communication devices 204 to access resources across different parts of the enterprise network without relying on the central anchor gateway. Each network gateway (214a, 214b, . . . 214n) in the multi-gateway enterprise networks 214 is configured to manage secure, encrypted connections and is equipped to handle custom key exchanges and derivation mechanisms as defined by the computer-implemented system 202. The multi-gateway enterprise networks 214 are integral to ensuring optimized routing paths, as they dynamically select a most efficient network gateways (214a, 214b, 214n) based on factors such as network traffic, user location, and resource availability. By distributing traffic across the multi-gateway enterprise networks 214, the computer-implemented system 202 reduces bottlenecks and enhances scalability and performance, particularly in large-scale enterprise environments with significant traffic demands.

Furthermore, each gateway (i.e, a first network gateway 214a or a second network gateway 214b or a N$^{th}$ network gateway 214n) within the multi-gateway enterprise networks 214 is capable of managing secure communications with each communication device 204 of the one or more communication devices 204 using a Security Parameter Index (SPI) values and specific routing protocols. This approach allows the computer-implemented system 202 to bypass the need for traditional central anchor gateway processing, enabling direct, encrypted connections between the one or more communication devices 204 and the desired network gateways (214a, 214b, 214n).

In an exemplary embodiment, the one or more databases 216 may configured to store, and manage data related to various aspects of the computer-implemented system 202. The one or more databases 216 may store at least one of, but not limited to, routing data and one or more encryption keys, user authentication data, and connection logs from the multi-gateway enterprise networks 214. The one or more databases 216 facilitate an efficient operation of the computer-implemented system 202 by maintaining records of network configurations, encryption protocols, and historical connection data for the peer-to-peer VPN connections within the multi-gateway enterprise networks 214. The one or more databases 216 also play a crucial role in managing and distributing the one or more encryption keys associated with custom key exchange mechanisms used across different network gateways (214a, 214b, . . . 214n) in the multi-gateway enterprise networks 214. By storing the one or more encryption keys centrally, the one or more databases 216 ensure that secure key distribution and synchronization are maintained across the multi-gateway enterprise networks 214, allowing for secure and seamless connections between the one or more communication devices 204 and the multi-gateway enterprise networks 214.

In addition to the one or more encryption keys and routing data, the one or more databases 216 may also store information on network performance metrics, gateway availability, and user access patterns. This data is used by the computer-implemented system 202 to dynamically adjust routing paths and optimize gateway selection based on real-time conditions. Furthermore, the one or more databases 216 support scalability by enabling the addition of new network gateways or the one or more communication devices 204 as needed, without compromising the integrity or performance of the VPN connections. The one or more databases 216 may include different types of databases such as, but not limited to, relational databases (e.g., Structured Query Language (SQL) databases), non-Structured Query Language (NoSQL) databases (e.g., MongoDB, Cassandra), time-series databases (e.g., InfluxDB), an OpenSearch database, and object storage systems (e.g., Amazon S3, PostgresDB).

In an exemplary embodiment, the one or more communication networks 212 may be, but not limited to, a wired communication network and/or a wireless communication network, a local area network (LAN), a wide area network (WAN), a Wireless Local Area Network (WLAN), a metropolitan area network (MAN), a telephone network, such as the Public Switched Telephone Network (PSTN) or a cellular network, an intranet, the Internet, a fiber optic network, a satellite network, a cloud computing network, or a combination of networks. The wired communication network may comprise, but not limited to, at least one of: Ethernet connections, Fiber Optics, Power Line Communications (PLCs), Serial Communications, Coaxial Cables, Quantum Communication, Advanced Fiber Optics, Hybrid Networks, and the like. The wireless communication network may comprise, but not limited to, at least one of: wireless fidelity (wi-fi), cellular networks (including fourth generation (4G) technologies and fifth generation (5G) technologies), Bluetooth, ZigBee, long-range wide area network (LoRaWAN), satellite communication, radio frequency identification (RFID), 6G (sixth generation) networks, advanced IoT protocols, mesh networks, non-terrestrial networks (NTNs), near field communication (NFC), and the like.

In an exemplary embodiment, the computer-implemented system 202 comprises one or more hardware processors 206 and a memory unit 208. The one or more hardware processors 206 may comprise a combination of discrete components, an integrated circuit, an application-specific integrated circuit, a field-programmable gate array, a digital signal processor, or other suitable hardware and a software. The "software" may comprise one or more objects, agents, threads, lines of code, subroutines, separate software applications, two or more lines of code, or other suitable software structures operating in one or more software applications. The memory unit 208 is operatively connected to the one or more hardware processors 206. The memory unit 208 comprises a set of computer-readable instructions in the form of the plurality of subsystems 210, configured to be executed by the one or more hardware processors 206.

In an exemplary embodiment, the one or more hardware processors 206 may include, for example, microprocessors, microcomputers, microcontrollers, digital signal processors, central processing units, state machines, logic circuits, and/or any devices that manipulate data or signals based on operational instructions. Among other capabilities, the one or more hardware processors 206 may fetch and execute computer-readable instructions in the memory unit 208 operationally coupled with the computer-implemented system 202 for performing tasks such as data processing, input/output processing, and/or any other functions. Any reference to a task in the present disclosure may refer to an operation being or that may be performed on data. The one or more hardware processors 206 is high-performance processors capable of handling large volumes of data and complex computations. The one or more hardware processors 206 may be, but not limited to, at least one of: multi-core central processing units (CPU), graphics processing units (GPUs), and specialized Artificial Intelligence (AI)

accelerators that enhance an ability of the computer-implemented system 202 to process real-time data from one or more sources simultaneously.

In an exemplary embodiment, the computer-implemented system 202 may be implemented by way of a single device or a combination of multiple devices that may be operatively connected or networked together. The computer-implemented system 202 may be implemented in hardware or a suitable combination of hardware and software.

Though few components and the plurality of subsystems 210 are disclosed in FIG. 2, there may be additional components and subsystems which is not shown, such as, but not limited to, ports, routers, repeaters, firewall devices, network devices, the one or more databases 216, network attached storage devices, assets, machinery, instruments, facility equipment, emergency management devices, image capturing devices, any other devices, and combination thereof. The person skilled in the art should not be limiting the components/subsystems shown in FIG. 2. Although FIG. 2 illustrates the computer-implemented system 202, and the one or more communication devices 204 connected to the one or more databases 216, one skilled in the art can envision that the computer-implemented system 202, and the one or more communication devices 204 may be connected to the one or more user devices located at various locations and several databases via the one or more communication networks 212.

Those of ordinary skilled in the art will appreciate that the hardware depicted in FIG. 2 may vary for particular implementations. For example, other peripheral devices such as an optical disk drive and the like, the local area network (LAN), the wide area network (WAN), wireless (e.g., wireless-fidelity (Wi-Fi)) adapter, graphics adapter, disk controller, input/output (I/O) adapter also may be used in addition or place of the hardware depicted. The depicted example is provided for explanation only and is not meant to imply architectural limitations concerning the present disclosure.

Those skilled in the art will recognize that, for simplicity and clarity, the full structure and operation of all data processing systems suitable for use with the present disclosure are not being depicted or described herein. Instead, only so much of the computer-implemented system 202 as is unique to the present disclosure or necessary for an understanding of the present disclosure is depicted and described. The remainder of the construction and operation of the computer-implemented system 202 may conform to any of the various current implementations and practices that were known in the art.

Figure 3A:
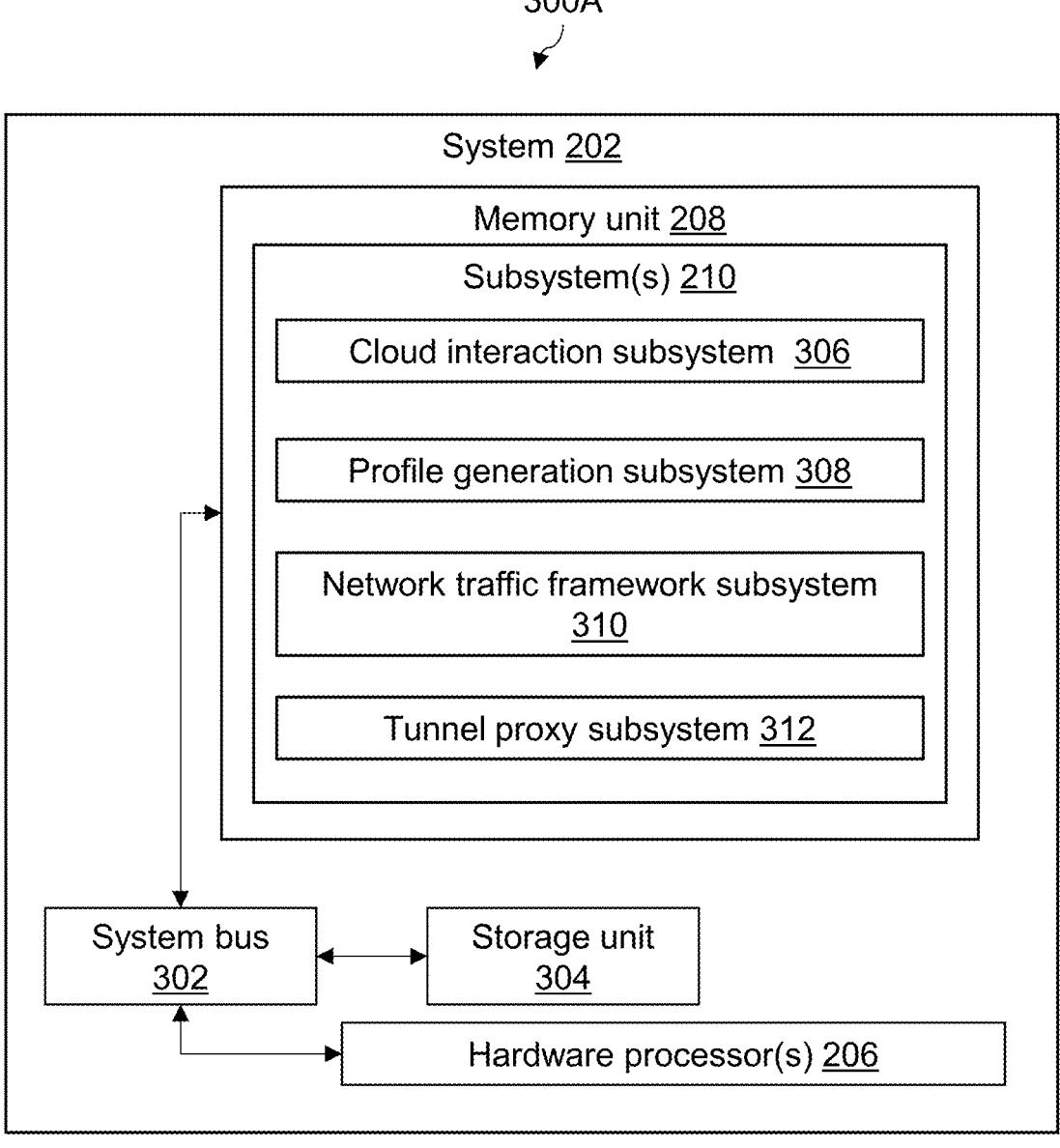
FIG. 3A illustrates an exemplary block diagram representation of the computer-implemented system as shown in FIG. 2 for providing the peer-to-peer VPN connections in the multi-gateway enterprise networks, in accordance with an embodiment of the present disclosure.
Figure 3B:
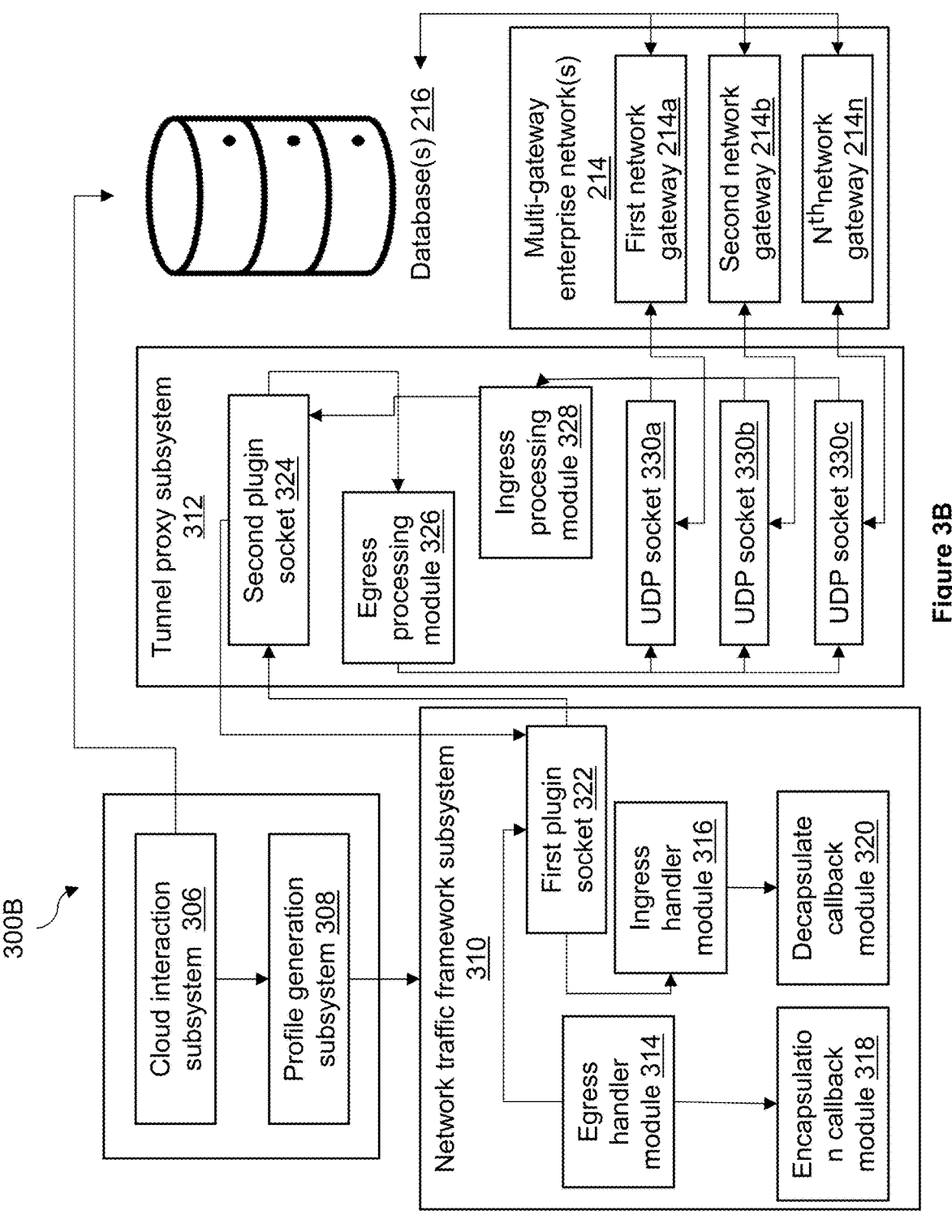
FIG. 3B illustrates an exemplary flow diagram representation of the computer-implemented system as shown in FIG. 3A for providing the peer-to-peer VPN connections in the multi-gateway enterprise networks, in accordance with an embodiment of the present disclosure.

FIG. 3A illustrates an exemplary block diagram representation 300A of the computer-implemented system 202 as shown in FIG. 2 for providing the peer-to-peer VPN connections in the multi-gateway enterprise networks 214, in accordance with an embodiment of the present disclosure;

FIG. 3B illustrates an exemplary flow diagram representation 300B of the computer-implemented system 202 as shown in FIG. 3A for providing the peer-to-peer VPN connections in the multi-gateway enterprise networks 214, in accordance with an embodiment of the present disclosure.

In an exemplary embodiment, the computer-implemented system 202 (hereinafter referred to as the system 202) comprises the one or more hardware processors 206, the memory unit 208, and a storage unit 304. The one or more hardware processors 206, the memory unit 208, and the storage unit 304 are communicatively coupled through a system bus 302 or any similar mechanism. The system bus 302 functions as the central conduit for data transfer and communication between the one or more hardware processors 206, the memory unit 208, and the storage unit 304. The system bus 302 facilitates the efficient exchange of information and instructions, enabling the coordinated operation of the system 202. The system bus 302 may be implemented using various technologies, including but not limited to, parallel buses, serial buses, or high-speed data transfer interfaces such as, but not limited to, at least one of a: universal serial bus (USB), peripheral component interconnect express (PCIe), and similar standards.

In an exemplary embodiment, the memory unit 208 is operatively connected to the one or more hardware processors 206. The memory unit 208 comprises the plurality of subsystems 210 in the form of programmable instructions executable by the one or more hardware processors 206. The plurality of subsystems 210 comprises a cloud interaction subsystem 306, a profile generation subsystem 308, a network traffic framework subsystem 310, and a tunnel proxy subsystem 312.

The one or more hardware processors 206, as used herein, means any type of computational circuit, such as, but not limited to, the microprocessor unit, microcontroller, complex instruction set computing microprocessor unit, reduced instruction set computing microprocessor unit, very long instruction word microprocessor unit, explicitly parallel instruction computing microprocessor unit, graphics processing unit, digital signal processing unit, or any other type of processing circuit. The one or more hardware processors 206 may also include embedded controllers, such as generic or programmable logic devices or arrays, application-specific integrated circuits, single-chip computers, and the like.

The memory unit 208 may be the non-transitory volatile memory and the non-volatile memory. The memory unit 208 may be coupled to communicate with the one or more hardware processors 206, such as being a computer-readable storage medium. The one or more hardware processors 206 may execute machine-readable instructions and/or source code stored in the memory unit 208. A variety of machine-readable instructions may be stored in and accessed from the memory unit 208. The memory unit 208 may include any suitable elements for storing data and machine-readable instructions, such as read-only memory, random access memory, erasable programmable read-only memory, electrically erasable programmable read-only memory, a hard drive, a removable media drive for handling compact disks, digital video disks, diskettes, magnetic tape cartridges, memory cards, and the like. In the present embodiment, the memory unit 208 includes the plurality of subsystems 210 stored in the form of machine-readable instructions on any of the above-mentioned storage media and may be in communication with and executed by the one or more hardware processors 206.

The storage unit 304 may be a cloud storage or the one or more databases 216 such as those shown in FIG. 2. The storage unit 304 may store a wide range of data, including but not limited to, dynamically generated recommended course of action sequences determined by the system 202 based on network conditions, security policies, and user preferences. These recommended course of action sequences facilitate to optimize VPN performance by identifying the best gateway network selections, encryption protocols, and routing paths within the multi-gateway enterprise networks 214. In addition to course of action sequences, the storage unit 304 may also retain historical data related to network traffic patterns, peer-to-peer connection performance metrics, and logs of previous VPN configurations. This data enables the system 202 to make data-driven decisions when configuring VPN profiles, optimizing peer-to-peer connectivity, and dynamically adjusting key exchange mechanisms for secure communications. Additionally, the storage unit 304 may retain previous action sequences for comparison and future reference, enabling continuous refinement of the system 202 over time. The storage unit 304 may be any kind of database such as, but not limited to, relational databases, dedicated databases, dynamic databases, monetized databases, scalable databases, cloud databases, distributed databases, any other databases, and a combination thereof.

In an exemplary embodiment, the cloud interaction subsystem 306 is configured to obtain at least one of: the routing data and the one or more encryption keys from the multi-gateway enterprise networks 214. The routing data comprises, but not limited to, at least one of: the gateway configurations, the network traffic routing data, the internet protocol (IP) address, the protocol type, the time of day, the traffic data type, and the like. The cloud interaction subsystem 306 operates as an interface between the system 202 and the multi-gateway enterprise networks 214, enabling seamless data retrieval and secure communications across multiple network gateways. Specifically, the cloud interaction subsystem 306 collects the routing data and the one or more encryption keys required to establish and maintain secure the peer-to-peer VPN connections within the multi-gateway enterprise networks 214. Upon obtaining at least one of: the routing data and the one or more encryption keys, the cloud interaction subsystem 306 securely stores this information within the one or more databases 216 (i.e., system server), which is essential for coordinating with the associated enterprise network 214. The associated enterprise network 214 may correspond to at least one of the various network gateways, such as is at least one of: the first network gateway 214*a*, the second network gateway 214*b*, and the N<sup>th</sup> network gateway 214*n*, depending on the specific routing and encryption requirements.

The cloud interaction subsystem 306 is also configured to update the stored at least one of: the routing data and the one or more encryption keys dynamically. This dynamic update functionality ensures that the system 202 remains responsive to changes in the multi-gateway enterprise networks 214, such as modifications to gateway configurations, shifts in network load, or updates to security protocols. As network conditions or enterprise policies evolve, the cloud interaction subsystem 306 actively retrieves at least one of: the routing data and the one or more encryption keys from the multi-gateway enterprise networks 214, making it possible for the system 202 to reconfigure VPN connections without manual intervention, thus optimizing security and performance in real time.

To facilitate efficient updates, the cloud interaction subsystem 306 continuously monitors the multi-gateway enterprise networks 214 for any changes that may impact at least one of: the routing data and the one or more encryption keys. When such changes are detected, the cloud interaction subsystem 306 promptly updates the corresponding records in the one or more databases 216. This approach allows the system 202 to provide adaptive VPN services, maintain connection integrity, and ensure that data exchanges across the multi-gateway enterprise networks 214 are consistently protected through up-to-date encryption methods and accurate routing information.

In an exemplary embodiment, the profile generation subsystem 308 is configured to generate one VPN profile that includes the local IP address for each user of the one or more users to facilitate connection with the associated enterprise network 214 within the multi-gateway enterprise networks 214. The profile generation subsystem 308 is a key component of the system 202 and is responsible for creating and managing customized VPN profiles for each user, enabling secure and efficient routing one of: the outgoing network traffic data and the incoming network traffic data through the associated enterprise network 214.

The profile generation subsystem 308 dynamically generates and updates the VPN profile to include the unique local IP address for each user. This local IP address serves as the user's identity within the network and is utilized by the multi-gateway enterprise networks 214 to authenticate, authorize, and direct traffic between the one or more communication devices 204 and the appropriate associated enterprise network 214 within the multi-gateway enterprise networks 214. The profile generation subsystem 308 monitors factors such as user location and the current availability of the associated enterprise network 214 to ensure that the local IP address is accurate and optimal for the user's connection needs.

The profile generation subsystem 308 is configured to update the local IP address in real-time based on at least one of: the user location and the availability of the associated enterprise network 214 within the multi-gateway enterprise networks 214. By doing so, the system 202 is able to route one of: the outgoing network traffic data and the incoming network traffic data, thereby ensuring low latency and efficient peer-to-peer VPN connectivity. For example, if the one or more users moves to a new location or if the associated enterprise network 214 becomes temporarily unavailable, the profile generation subsystem 308 promptly adjusts the local IP address associated with the VPN profile, enabling seamless reconnection and preventing disruption to the user's VPN session.

In an exemplary embodiment, the network traffic framework subsystem 310 is configured to manage the secure transmission and reception of network traffic data between the generated VPN profile and the associated enterprise network within the multi-gateway enterprise networks 214. The network traffic framework subsystem 310 is essential for handling the encapsulation and decapsulation of one of: the outgoing network traffic data and the incoming network traffic data, ensuring that outgoing data packets and incoming data packets adhere to the security and routing protocols established by the system 202.

The network traffic framework subsystem 310 operates by encapsulating the outgoing network traffic data obtained from the VPN profile, transmitting this encapsulated data to the associated enterprise network 214, and subsequently decapsulating incoming network traffic data to relay back to the VPN profile. The system 202 enhances secure communication by safeguarding data as it traverses the multi-gateway enterprise networks 214, leveraging secure encapsulation and decapsulation methodologies.

To achieve this, the network traffic framework subsystem 310 comprises an egress handler module 314 and an ingress handler module 316. The egress handler module 314 and the ingress handler module 316 are responsible for specific functions related to the encapsulation and decapsulation processes, respectively. The egress handler module 314 is responsible for processing outgoing network traffic data from the VPN profile associated with each user of the one or more users. Upon receiving the outgoing network traffic data, it prepares the outgoing data packets for secure transmission by connecting to an encapsulation callback module 318.

In an exemplary embodiment, the encapsulation callback module 318 utilizes Internet Protocol Security (IPSEC) to encapsulate the outgoing data. This encapsulation process includes adding essential elements such as but not limited to, at least one of: source ports, destination ports, sequence numbers, source IP address, destination IP address, media access control (MAC) address, and the like, and other relevant information necessary for secure transmission within the multi-gateway enterprise networks 214. Once encapsulated, the egress handler module 314 updates the User Datagram Protocol (UDP) encapsulation Security Parameter Index (SPID) protocol header fields associated with the outgoing network traffic data. These UDP encapsulation SPID header fields are modified based on parameters that include, but are not limited to, the routing data and encryption keys obtained from the cloud interaction subsystem 306. By updating these UDP encapsulation SPID header fields, the egress handler module 314 ensures that the encapsulated data is correctly formatted and compatible with the associated enterprise network's 214 security and routing protocols, allowing for optimized, secure transmission within the multi-gateway enterprise networks 214.

In an exemplary embodiment, on the receiving end, the ingress handler module 316 handles incoming network traffic data from the associated enterprise network 214. The ingress handler module 316 is connected to a decapsulate callback module 320, which plays a crucial role in processing the incoming data packets. The decapsulate callback module 320 removes the IPSEC encapsulation from the incoming data, extracting information such as sequence numbers, source IP addresses, destination IP addresses, and other relevant data encapsulated by the enterprise network during transmission. After decapsulation, the ingress handler module 316 transmits the processed data to the VPN profile associated with the user within the multi-gateway enterprise networks 214. This step ensures that the incoming network traffic data is accurately and securely delivered to the user's communication device 204 within the one or more communication devices 204, maintaining the integrity and confidentiality of the information exchanged. The decapsulate callback module 320 is able to handle decapsulation allowing the system 202 to provide a seamless and secure user experience, enabling each user of the one or more users to receive incoming traffic data as expected within their VPN session. By implementing the network traffic framework subsystem 310, the system 202 effectively manages one of: the outgoing network traffic data and the incoming network traffic data for secure, low-latency communication.

In an exemplary embodiment, the tunnel proxy subsystem 312 is operatively connected to the cloud interaction subsystem 306 and the network traffic framework subsystem 310. The tunnel proxy subsystem 312 is operatively connected to the network traffic framework subsystem 310 through a first plugin socket 322 and a second plugin socket 324. The tunnel proxy subsystem 312 is configured to multiplex the encapsulated outgoing network traffic data. The multiplexing of the outgoing network traffic data is based on at least one of: the SPI of the encapsulated outgoing network traffic data, and at least one of: the routing data and the one or more encryption keys, for routing the outgoing network traffic data to the associated enterprise network 214 within the multi-gateway enterprise networks 214. The tunnel proxy subsystem 312 is configured to encrypt the multiplexed outgoing network traffic data with the apposite encryption key within the one or more encryption keys to determine the associated enterprise network 214 within the multi-gateway enterprise networks 214 for routing the outgoing network traffic data from the VPN profile.

In an exemplary embodiment, the tunnel proxy subsystem 312 comprises an egress processing module 326 and an ingress processing module 328. The egress processing module 326 and the ingress processing module 328 are operatively connected to the egress handler module 314 and the ingress handler module 316 respectively through the first plugin socket 322 and the second plugin socket 324. The egress processing module 326 is configured to map the encapsulated outgoing network traffic data to the associated enterprise network 214 within the multi-gateway enterprise networks 214 using a corresponding User Datagram Protocol (UDP) socket (330a, 330b, 330c) based on at least one of: the routing data and the one or more encryption keys. The UDP socket (330a, 330b, 330c) is a network communication endpoint that uses the UDP protocol to send and receive data between devices over the internet or a local network. Unlike the Transmission Control Protocol (TCP), the UDP socket (330a, 330b, 330c) is connectionless and does not require establishing a dedicated connection before data is transmitted, which makes it faster but less reliable in terms of guaranteeing packet delivery and order.

In an exemplary embodiment, the tunnel proxy subsystem 312 is configured to de-multiplex the received incoming network traffic data from the associated enterprise network 214 within the multi-gateway enterprise networks 214 based on at least one of: the SPI of the incoming network traffic data and at least one of: the routing data and the one or more encryption keys for routing the incoming network traffic data to the network traffic framework subsystem 310 for decapsulating. The tunnel proxy subsystem 312 is configured to decrypt the incoming network traffic data with the apposite/appropriate encryption key within the one or more encryption keys to de-multiplex the received incoming network traffic data for identifying the VPN profile of the associated user within the one or more users. The tunnel proxy subsystem 312 is configured to provide the peer-to-peer VPN connections in the multi-gateway enterprise networks 214 based on encrypting and decrypting the outgoing network traffic data and the incoming network traffic data respectively using at least one of: the routing data and the one or more encryption keys.

In an exemplary embodiment, the ingress processing module 328 is configured to map the incoming network traffic data from the multi-gateway enterprise networks 214 to the VPN profile of the associated user within the one or more users based on at least one of: the corresponding UDP socket (330a, 330b, 330c) associated with the associated enterprise network 214 within the multi-gateway enterprise networks 214, and the UDP encapsulation SPID protocol header fields. The first plugin socket 322 and the second plugin socket 324 are essential for the real-time handling of network traffic data. The first plugin socket 322 and the second plugin socket 324 enable the bidirectional flow of data through the tunnel proxy subsystem 312, ensuring seamless integration with the network traffic framework subsystem 310. The first plugin socket 322 and the second plugin socket 324 provide low-latency, high-throughput data transfer, essential for maintaining the performance and efficiency of peer-to-peer VPN connections in the multi-gateway enterprise networks 214.

In an instance case, consider a corporate user connected to a multi-gateway VPN system where their one or more communication devices 204 i.e., a laptop needs to securely communicate with the multi-gateway enterprise networks 214 located in different geographic regions. The tunnel proxy subsystem 312 on the laptop utilizes the UDP sockets (330a, 330b, 330c) to facilitate rapid and efficient data exchange, bypassing a central gateway and connecting directly to the nearest associated enterprise network 214 based on real-time routing data and the one or more encryption keys. When the user sends data, the tunnel proxy subsystem's 312 egress processing module 326 encapsulates the outgoing data using IPSEC, then encrypts and multiplexes it through a UDP socket (330a, 330b, 330c) linked to the nearest associated enterprise network 214. On receiving incoming data, the ingress processing module 328 decrypts and de-multiplexes it based on the SPI and other parameters, ensuring it reaches the user's VPN profile promptly. This peer-to-peer approach minimizes latency, optimizes routing, and enhances performance, providing the user with a seamless, secure connection to the corporate resources, regardless of their location.

FIG. 4 illustrates an exemplary flow chart of a computer-implemented method 400 for providing the peer-to-peer VPN connections in the multi-gateway enterprise networks 214, in accordance with an embodiment of the present disclosure.

In accordance with an embodiment of the present disclosure, the computer-implemented method 400 for providing peer-to-peer VPN connections in the multi-gateway enterprise networks is disclosed. At step 402, the computer-implemented method 400 includes obtaining, by the one or more hardware processors through the cloud interaction subsystem, at least one of: the routing data and the one or more encryption keys from the multi-gateway enterprise networks. The obtained least one of: the routing data and the one or more encryption keys are configured to store in the one or more databases. The routing data comprises at least one of: the gateway configurations, the network traffic routing data, the internet protocol (IP) addresses, the protocol type, the time of day, and the traffic data type.

At step 404, the computer-implemented method 400 includes generating, by the one or more hardware processors through the profile generation subsystem, the VPN profile (single VPN profile) comprises the local internet IP address for each user of the one or more users. The single VPN profile is configured to connect with the associated enterprise network within the multi-gateway enterprise networks. The computer-implemented method 400 includes updating, by the one or more hardware processors through the profile generation subsystem, the local IP address in real-time based on at least one of: the user location and the availability of the associated enterprise network within the multi-gateway enterprise networks, for routing one of: the outgoing network traffic data and the incoming network traffic data.

At step 406, the computer-implemented method 400 includes performing, by the one or more hardware processors through the network traffic framework subsystem, one of: a) encapsulating the outgoing network traffic data obtained from the generated VPN profile; b) transmitting the encapsulated outgoing network traffic data to the associated enterprise network within the multi-gateway enterprise networks; c) decapsulating incoming network traffic data received from the associated enterprise network within the multi-gateway enterprise networks; and d) transmitting the decapsulated incoming network traffic data to the VPN profile. The network traffic framework subsystem comprises the egress handler module and the ingress handler module.

In an exemplary embodiment, the egress handler module is operatively connected to the encapsulation callback module. The encapsulation callback module is configured to encapsulate the outgoing network traffic data associated with the VPN profile using the IPSEC containing at least one of: the source ports, the destination ports, the sequence numbers, the source IP address, the destination IP address, and the MAC addresses. The egress handler module is configured to update the UDP encapsulation SPID protocol header fields associated with the outgoing network traffic data. The update is based on at least one of: the routing data and the one or more encryption keys for encapsulating the outgoing network traffic data. The ingress handler module is operatively connected to the decapsulate callback module. The decapsulate callback module is configured to decapsulate the incoming network traffic data received from the tunnel proxy subsystem and transmit it to the VPN profile of an associated user within the one or more users.

At step 408, the computer-implemented method 400 includes multiplexing, by the one or more hardware processors through the tunnel proxy subsystem, the encapsulated outgoing network traffic data based on at least one of: the SPI of the encapsulated outgoing network traffic data, and at least one of: the routing data and the one or more encryption keys. The multiplexing of the outgoing network traffic data is used for routing the outgoing network traffic data to the associated enterprise network within the multi-gateway enterprise networks. In the next step 410, the computer-implemented method 400 includes encrypting, by the one or more hardware processors through the tunnel proxy subsystem, the multiplexed outgoing network traffic data with the apposite encryption key within the one or more encryption keys to determine the associated enterprise network within the multi-gateway enterprise networks for routing the outgoing network traffic data from the VPN profile.

At step 412, the computer-implemented method 400 includes de-multiplexing, by the one or more hardware processors through the tunnel proxy subsystem. The de-multiplexing is done on the received incoming network traffic data from the associated enterprise network within the multi-gateway enterprise networks based on at least one of: the SPI of the incoming network traffic data and at least one of: the routing data and the one or more encryption keys. The de-multiplexing of the received incoming network traffic data is used for routing the incoming network traffic data to the network traffic framework subsystem for decapsulating. In the next step 414, the computer-implemented method 400 includes decrypting, by the one or more hardware processors through the tunnel proxy subsystem, the incoming network traffic data with the apposite encryption key within the one or more encryption keys to de-multiplex the received incoming network traffic data for identifying the VPN profile of the associated user within the one or more users.

In an embodiment, the tunnel proxy subsystem comprises the egress processing module, and the ingress processing module. The egress processing module is configured to map the encapsulated outgoing network traffic data to the associated enterprise network within the multi-gateway enterprise networks using the corresponding UDP socket based on at least one of: the routing data and the one or more encryption keys. The ingress processing module is configured to map the incoming network traffic data from the multi-gateway enterprise networks to the VPN profile of the associated user within the one or more users based on at least one of: the corresponding UDP socket associated with the associated enterprise network within the multi-gateway enterprise networks, and the UDP encapsulation SPID protocol header fields.

At step 416, the computer-implemented method 400 includes providing, by the one or more hardware processors through the tunnel proxy subsystem, the peer-to-peer VPN connections in the multi-gateway enterprise networks based on encrypting and decrypting the outgoing network traffic data and the incoming network traffic data respectively using at least one of: the routing data and the one or more encryption keys.

Figure 5:
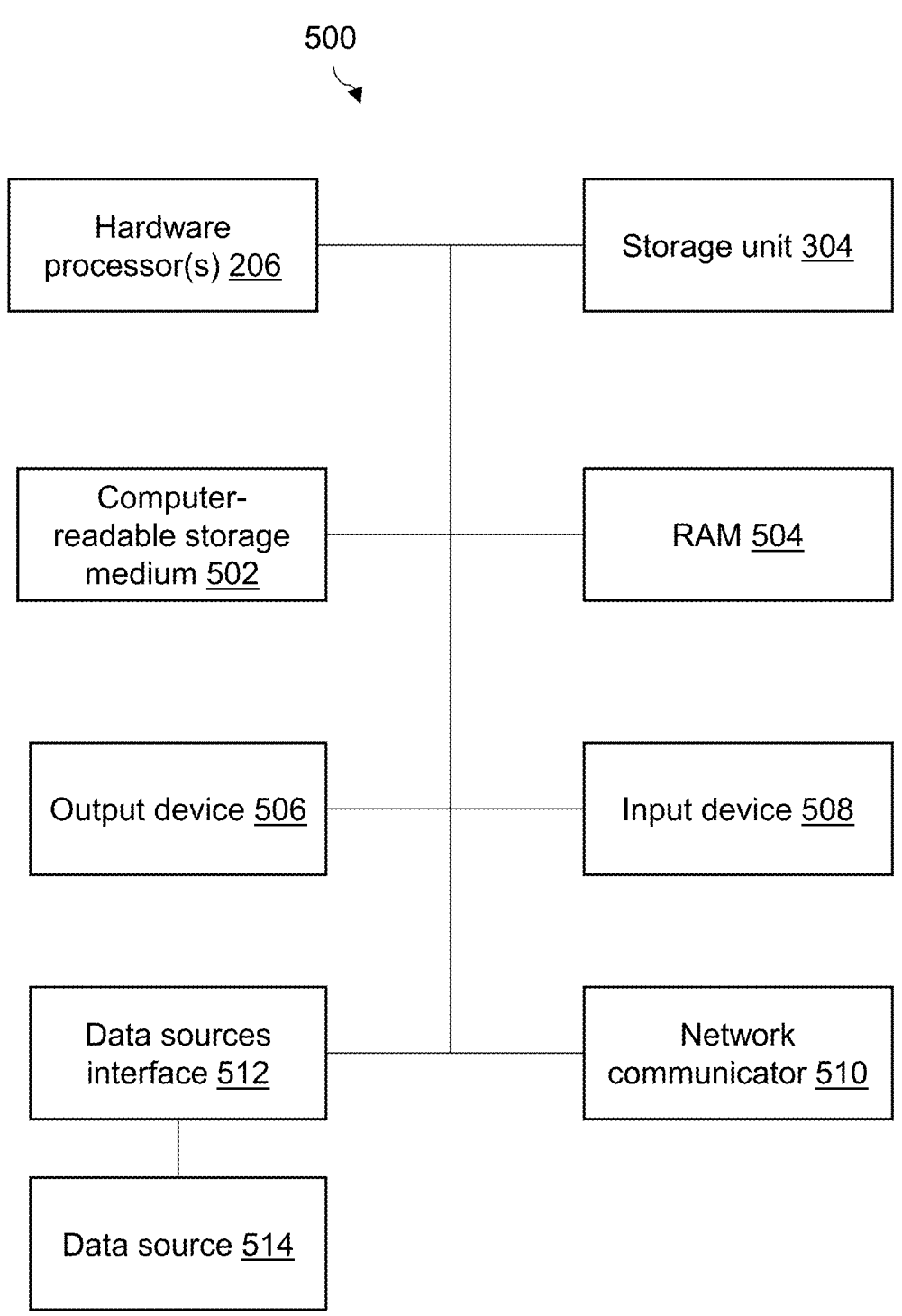
FIG. 5 illustrates an exemplary block diagram representation of a server platform for implementation of the disclosed computer-implemented system, in accordance with an embodiment of the present disclosure.

FIG. 5 illustrates an exemplary block diagram representation of a server platform 500 for implementation of the disclosed system 202, in accordance with an embodiment of the present disclosure.

In an exemplary embodiment, for the sake of brevity, the construction, and operational features of the system 202 which are explained in detail above are not explained in detail herein. Particularly, computing machines such as but not limited to internal/external server clusters, quantum computers, desktops, laptops, smartphones, tablets, and wearables may be used to execute the system 202 or may include the structure of the server platform 500. As illustrated, the server platform 500 may include additional components not shown, and some of the components described may be removed and/or modified. For example, a computer system with the multiple graphics processing units (GPUs) may be located on at least one of: internal printed circuit boards (PCBs) and external-cloud platforms including Amazon Web Services (AWS), Google Cloud Platform (GCP) Microsoft Azure (Azure), internal corporate cloud computing clusters, or organizational computing resources.

The server platform 500 may be a computer system such as the system 202 that may be used with the embodiments described herein. The computer system may represent a computational platform that includes components that may be in the one or more hardware processors 206 or another computer system. The computer system may be executed by the one or more hardware processors 206 (e.g., single, or multiple processors) or other hardware processing circuits, the methods, functions, and other processes described herein. These methods, functions, and other processes may be embodied as machine-readable instructions stored on a computer-readable medium, which may be non-transitory, such as hardware storage devices (e.g., RAM (random access memory), ROM (read-only memory), EPROM (erasable, programmable ROM), EEPROM (electrically erasable, programmable ROM), hard drives, and flash memory). The computer system may include the one or more hardware processors 206 that execute software instructions or code stored on a non-transitory computer-readable storage medium 502 to perform methods of the present disclosure. The software code includes, for example, instructions to gather data and analyze the network environment data. For example, the plurality of subsystems 210 includes the cloud interaction subsystem 306, the profile generation subsystem 308, the network traffic framework subsystem 310, and the tunnel proxy subsystem 312.

The instructions on the computer-readable storage medium 502 are read and stored the instructions in the storage unit 304 or random-access memory (RAM) 504. The storage unit 304 may provide a space for keeping static data where at least some instructions could be stored for later execution. The stored instructions may be further compiled to generate other representations of the instructions and dynamically stored in the RAM 504. The one or more hardware processors 206 may read instructions from the RAM 504 and perform actions as instructed.

The computer system may further include an output device 506 to provide at least some of the results of the execution as output including, but not limited to, validation of the one or more orchestration platforms, one or more microservice container images deployment status and the like. The output device 506 may include a display on computing devices and virtual reality glasses. For example, the display may be a mobile phone screen or a laptop screen. Graphical user interface (GUIs) and/or text may be presented as an output on the display screen. The computer system may further include an input device 508 to provide the one or more users or another device with mechanisms for entering data and/or otherwise interacting with the computer system. The input device 508 may include, for example, a keyboard, a keypad, a mouse, or a touchscreen. Each of these output devices 506 and the input device 508 may be joined by one or more additional peripherals.

A network communicator 510 may be provided to connect the computer system to a network and in turn to other devices connected to the network including other entities, servers, data stores, and interfaces. The network communicator 510 may include, for example, a network adapter such as a LAN adapter or a wireless adapter. The computer system may include a data sources interface 512 to access a data source 514. The data source 514 may be an information resource about the multi-gateway enterprise networks 214, and the user locations. As an example, the one or more databases 216 of exceptions and rules may be provided as the data source 514. Moreover, knowledge repositories and curated data may be other examples of the data source 514. The data source 514 may include libraries containing, but not limited to, network configuration data, security policies, encryption protocols, routing instructions, and information on user access rights and permissions. The data source 514 can also encompass logs of network activities, historical connection data, and records of previously utilized encryption keys and protocols. Additionally, the data source 514 may store curated knowledge repositories and databases of rules and exceptions relevant to the multi-gateway enterprise networks 214, enabling efficient access to and management of critical operational information. The data source 514 may further include external knowledge bases, such as third-party security advisories, threat intelligence feeds, and best practice guidelines for network optimization.

Numerous advantages of the present disclosure may be apparent from the discussion above. In accordance with the present disclosure, the system bypasses centralized VPN gateways, enables direct peer-to-peer VPN connections between user devices and multiple enterprise network gateways. This reduces unnecessary routing hops and minimizes latency, enhancing overall network performance. The system automatically generates and updates VPN profiles for each user in real-time based on their location and the availability of the multi-gateway enterprise networks. This eliminates the need for manual VPN profile switching, streamlining the user experience and improving connectivity. The network traffic framework subsystem encapsulates and decapsulates both outgoing and incoming traffic efficiently using IPSEC, ensuring secure transmission of data with minimal overhead. This reduces encryption/decryption complexity and boosts performance.

The tunnel proxy subsystem multiplexes outgoing data and de-multiplexes incoming data based on the SPI, routing data, and the one or more encryption keys. This enhances data flow efficiency, minimizes congestion, and supports optimal use of network resources. The system dynamically manages and updates the one or more encryption keys, ensuring secure data transmission across different gateways without sacrificing performance. This automatic key handling improves security while simplifying network administration. By avoiding central VPN gateways, the system distributes traffic load across the multi-gateway enterprise networks, preventing bottlenecks and enhancing the scalability of the multi-gateway enterprise networks. The use of customized key exchange mechanisms and encryption protocols ensures a high level of security, protecting data from external threats while maintaining confidentiality and integrity. Direct peer-to-peer VPN connections eliminate unnecessary routing through centralized gateways, reducing latency and avoiding network congestion, thus providing faster and more responsive communication for end-users.

A description of an embodiment with several components in communication with each other does not imply that all such components are required. On the contrary, a variety of optional components are described to illustrate the wide variety of possible embodiments of the invention. When a single device or article is described herein, it will be apparent that more than one device/article (whether or not they cooperate) may be used in place of a single device/article. Similarly, where more than one device or article is described herein (whether or not they cooperate), it will be apparent that a single device/article may be used in place of the more than one device or article, or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open-ended in that an item or items following any one of these words is not meant to be an exhaustive listing of such item or items or meant to be limited to only the listed item or items. It must also be noted that as used herein and in the appended claims, the singular forms "a," "an," and "the" include plural references unless the context clearly dictates otherwise.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the embodiments of the present invention are intended to be illustrative, but not limiting, of the scope of the invention, which is set forth in the following claims.

What is claimed is:

1. A computer-implemented method for providing peer-to-peer virtual private network (VPN) connections in multi-gateway enterprise networks, comprising:

obtaining, by one or more hardware processors through a cloud interaction subsystem, at least one of: routing data and one or more encryption keys from the multi-gateway enterprise networks to store in one or more databases;

generating, by the one or more hardware processors through a profile generation subsystem, a virtual private network (VPN) profile comprises a local internet protocol (IP) address for each user of one or more users to connect with an associated enterprise network within the multi-gateway enterprise networks;

performing, by the one or more hardware processors through a network traffic framework subsystem, one of:

encapsulating outgoing network traffic data obtained from the generated virtual private network (VPN) profile;

transmitting the encapsulated outgoing network traffic data to the associated enterprise network within the multi-gateway enterprise networks;

decapsulating incoming network traffic data received from the associated enterprise network within the multi-gateway enterprise networks; and transmitting the decapsulated incoming network traffic data to the virtual private network (VPN) profile;

multiplexing, by the one or more hardware processors through a tunnel proxy subsystem, the encapsulated outgoing network traffic data based on at least one of: a security parameter index (SPI) of the encapsulated outgoing network traffic data, and at least one of: the routing data and the one or more encryption keys, for routing the outgoing network traffic data to the associated enterprise network within the multi-gateway enterprise networks;

encrypting, by the one or more hardware processors through the tunnel proxy subsystem, the multiplexed outgoing network traffic data with an apposite encryption key within the one or more encryption keys to determine the associated enterprise network within the multi-gateway enterprise networks for routing the outgoing network traffic data from the virtual private network (VPN) profile;

de-multiplexing, by the one or more hardware processors through the tunnel proxy subsystem, the received incoming network traffic data from the associated enterprise network within the multi-gateway enterprise networks based on at least one of: the security parameter index (SPI) of the incoming network traffic data and at least one of: the routing data and the one or more encryption keys for routing the incoming network traffic data to the network traffic framework subsystem for decapsulating;

decrypting, by the one or more hardware processors through the tunnel proxy subsystem, the incoming network traffic data with the apposite encryption key within the one or more encryption keys to de-multiplex the received incoming network traffic data for identifying the virtual private network (VPN) profile of an associated user within the one or more users; and providing, by the one or more hardware processors through the tunnel proxy subsystem, the peer-to-peer virtual private network (VPN) connections in the multi-gateway enterprise networks based on encrypting and decrypting the outgoing network traffic data and the incoming network traffic data respectively using at least one of: the routing data and the one or more encryption keys.

2. The computer-implemented method of claim 1, wherein the routing data comprises at least one of: gateway configurations, network traffic routing data, internet protocol (IP) addresses, protocol type, time of day, and traffic data type;

the cloud interaction subsystem dynamically update the stored at least one of: the routing data and the one or more encryption keys based on changes in the multi-gateway enterprise networks.

3. The computer-implemented method of claim 1, further comprising:

updating, by the one or more hardware processors through the profile generation subsystem, the local internet protocol (IP) address in real-time based on at least one of: a user location and an availability of the associated enterprise network within the multi-gateway enterprise networks, for routing one of: the outgoing network traffic data and the incoming network traffic data.

4. The computer-implemented method of claim 1, wherein the network traffic framework subsystem comprises an egress handler module, the egress handler module operatively connected to an encapsulation callback module configured to:

encapsulate the outgoing network traffic data associated with the virtual private network (VPN) profile using Internet Protocol Security (IPSEC) containing at least one of: source ports, destination ports, sequence numbers, source internet protocol (IP) address, destination internet protocol (IP) address, and media access control (MAC) Address; and update User Datagram Protocol (UDP) encapsulation Security Parameter Index (SPID) protocol header fields associated with the outgoing network traffic data based on at least one of: the routing data and the one or more encryption keys for encapsulating the outgoing network traffic data.

5. The computer-implemented method of claim 1, wherein the network traffic framework subsystem comprises an ingress handler module, the ingress handler module operatively connected to a decapsulate callback module configured to decapsulate the incoming network traffic data received from the tunnel proxy subsystem and transmit to the virtual private network (VPN) profile of the associated user within the one or more users.

6. The computer-implemented method of claim 1, wherein the tunnel proxy subsystem comprises an egress processing module, the egress processing module is configured to map the encapsulated outgoing network traffic data to the associated enterprise network within the multi-gateway enterprise networks using a corresponding User Datagram Protocol (UDP) socket based on at least one of: the routing data and the one or more encryption keys.

7. The computer-implemented method of claim 1, wherein the tunnel proxy subsystem comprises an ingress processing module, the ingress processing module is configured to map the incoming network traffic data from the multi-gateway enterprise networks to the virtual private network (VPN) profile of the associated user within the one or more users based on at least one of: the corresponding User Datagram Protocol (UDP) socket associated with the associated enterprise network within the multi-gateway enterprise networks, and the User Datagram Protocol (UDP) encapsulation Security Parameter Index (SPID) protocol header fields.

8. A computer-implemented system for providing peer-to-peer virtual private network (VPN) connections in multi-gateway enterprise networks, comprising:

one or more hardware processors;

a memory unit operatively connected to the one or more hardware processors, wherein the memory unit comprises a set of computer-readable instructions in form of a plurality of subsystems, configured to be executed by the one or more hardware processors, wherein the plurality of subsystems comprises:

a cloud interaction subsystem configured to:

obtain at least one of: routing data and one or more encryption keys from the multi-gateway enterprise networks;

store the obtained at least one of: the routing data and the one or more encryption keys in one or more databases for communicating with an associated enterprise network within the multi-gateway enterprise networks; and dynamically update the stored at least one of: the routing data and the one or more encryption keys based on changes in the multi-gateway enterprise networks;

a profile generation subsystem configured to generate a virtual private network (VPN) profile comprises a local internet protocol (IP) address for each user of one or more users to connect with the associated enterprise network within the multi-gateway enterprise networks;

a network traffic framework subsystem configured to perform one of:

encapsulate outgoing network traffic data obtained from the generated virtual private network (VPN) profile;

transmit the encapsulated outgoing network traffic data to the associated enterprise network within the multi-gateway enterprise networks;

decapsulate incoming network traffic data received from the associated enterprise network within the multi-gateway enterprise networks; and transmit the decapsulated incoming network traffic data to the virtual private network (VPN) profile;

a tunnel proxy subsystem operatively connected to the cloud interaction subsystem and the network traffic framework subsystem, configured to:

multiplex the encapsulated outgoing network traffic data based on at least one of: a security parameter index (SPI) of the encapsulated outgoing network traffic data, and at least one of: the routing data and the one or more encryption keys, for routing the outgoing network traffic data to the associated enterprise network within the multi-gateway enterprise networks;

encrypt the multiplexed outgoing network traffic data with an apposite encryption key within the one or more encryption keys to determine the associated enterprise network within the multi-gateway enterprise networks for routing the outgoing network traffic data from the virtual private network (VPN) profile;

de-multiplex the received incoming network traffic data from the associated enterprise network within the multi-gateway enterprise networks based on at least one of: the security parameter index (SPI) of the incoming network traffic data and at least one of: the routing data and the one or more encryption keys for routing the incoming network traffic data to the network traffic framework subsystem for decapsulating;

decrypt the incoming network traffic data with the apposite encryption key within the one or more encryption keys to de-multiplex the received incoming network traffic data for identifying the virtual private network (VPN) profile of an associated user within the one or more users; and provide the peer-to-peer virtual private network (VPN) connections in the multi-gateway enterprise networks based on encrypting and decrypting the outgoing network traffic data and the incoming network traffic data respectively using at least one of: the routing data and the one or more encryption keys.

9. The computer-implemented system of claim 8, wherein the routing data comprises at least one of: gateway configurations, network traffic routing data, internet protocol (IP) addresses, protocol type, time of day, and traffic data type.

10. The computer-implemented system of claim 8, wherein the profile generation subsystem is configured to update the local internet protocol (IP) address in real-time based on at least one of: a user location and an availability of the associated enterprise network within the multi-gateway enterprise networks network, for routing one of: the outgoing network traffic data and the incoming network traffic data.

11. The computer-implemented system of claim 8, wherein the network traffic framework subsystem comprises an egress handler module, the egress handler module operatively connected to an encapsulation callback module configured to:

encapsulate the outgoing network traffic data associated with the virtual private network (VPN) profile using Internet Protocol Security (IPSEC) containing at least one of: source ports, destination ports, sequence numbers, source internet protocol (IP) address, destination internet protocol (IP) address, and media access control (MAC) Address; and update User Datagram Protocol (UDP) encapsulation Security Parameter Index (SPID) protocol header fields associated with the outgoing network traffic data based on at least one of: the routing data and the one or more encryption keys for encapsulate the outgoing network traffic data.

12. The computer-implemented system of claim 8, wherein the network traffic framework subsystem comprises an ingress handler module, the ingress handler module operatively connected to a decapsulate callback module configured to decapsulate the incoming network traffic data received from the tunnel proxy subsystem and transmit to the virtual private network (VPN) profile of the associated user within the one or more users.

13. The computer-implemented system of claim 8, wherein the tunnel proxy subsystem comprises an egress processing module, the egress processing module configured map the encapsulated outgoing network traffic data to the associated enterprise network within the multi-gateway enterprise networks using a corresponding User Datagram Protocol (UDP) socket based on at least one of: the routing data and the one or more encryption keys.

14. The computer-implemented system of claim 8, wherein the tunnel proxy subsystem comprises an ingress processing module, the ingress processing module configured map the incoming network traffic data from the multi-gateway enterprise networks to the virtual private network (VPN) profile of the associated user within the one or more users based on at least one of: the corresponding User Datagram Protocol (UDP) socket associated with the associated enterprise network within the multi-gateway enterprise networks, and the User Datagram Protocol (UDP) encapsulation Security Parameter Index (SPID) protocol header fields.

15. A non-transitory computer-readable storage medium storing computer-executable instructions that, when executed by one or more hardware processors, cause the one or more hardware processors to perform operations for providing peer-to-peer virtual private network (VPN) connections in multi-gateway enterprise networks, the operations comprising:

obtaining at least one of: routing data and one or more encryption keys from the multi-gateway enterprise networks to store in one or more databases;

generating a virtual private network (VPN) profile comprises a local internet protocol (IP) address for each user of one or more users to connect with the associated enterprise network within the multi-gateway enterprise networks;

performing one of:

encapsulating outgoing network traffic data obtained from the generated virtual private network (VPN) profile;

transmitting the encapsulated outgoing network traffic data to the associated enterprise network within the multi-gateway enterprise networks;

decapsulating incoming network traffic data received from the associated enterprise network within the multi-gateway enterprise networks; and transmitting the decapsulated incoming network traffic data to the virtual private network (VPN) profile;

multiplexing the encapsulated outgoing network traffic data based on at least one of: a security parameter index (SPI) of the encapsulated outgoing network traffic data, and at least one of: the routing data and the one or more encryption keys, for routing the outgoing network traffic data to the associated enterprise network within the multi-gateway enterprise networks;

encrypting the multiplexed outgoing network traffic data with an apposite encryption key within the one or more encryption keys to determine the associated enterprise network within the multi-gateway enterprise networks for routing the outgoing network traffic data from the virtual private network (VPN) profile;

de-multiplexing the received incoming network traffic data from the associated enterprise network within the multi-gateway enterprise networks based on at least one of: the security parameter index (SPI) of the incoming network traffic data and at least one of: the routing data and the one or more encryption keys for routing the incoming network traffic data to a network traffic framework subsystem for decapsulating;

decrypting the incoming network traffic data with the apposite encryption key within the one or more encryption keys to de-multiplex the received incoming network traffic data for identifying the virtual private network (VPN) profile of an associated user within the one or more users; and providing the peer-to-peer virtual private network (VPN) connections in the multi-gateway enterprise networks based on encrypting and decrypting the outgoing network traffic data and the incoming network traffic data respectively using at least one of: the routing data and the one or more encryption keys.

16. The non-transitory computer-readable storage medium of claim 15, further comprising:

updating, by the one or more hardware processors through the profile generation subsystem, the local internet protocol (IP) address in real-time based on at least one of: a user location and an availability of the associated enterprise network within the multi-gateway enterprise networks network, for routing one of: the outgoing network traffic data and the incoming network traffic data.

17. The non-transitory computer-readable storage medium of claim 15, wherein the network traffic framework subsystem comprises an egress handler module, the egress handler module operatively connected to an encapsulation callback module configured to:

encapsulate the outgoing network traffic data associated with the virtual private network (VPN) profile using Internet Protocol Security (IPSEC) containing at least one of: source ports, destination ports, sequence numbers, source internet protocol (IP) address, destination internet protocol (IP) address, and media access control (MAC) Address; and update User Datagram Protocol (UDP) encapsulation Security Parameter Index (SPID) protocol header fields associated with the outgoing network traffic data based on at least one of: the routing data and the one or more encryption keys for encapsulate the outgoing network traffic data.

18. The non-transitory computer-readable storage medium of claim 15, wherein the network traffic framework subsystem comprises an ingress handler module, the ingress handler module operatively connected to a decapsulate callback module configured to decapsulate the incoming network traffic data received from a tunnel proxy subsystem and transmit to the virtual private network (VPN) profile of the associated user within the one or more users.

19. The non-transitory computer-readable storage medium of claim 15, wherein the network traffic framework subsystem comprises an egress processing module, the egress processing module configured map the encapsulated outgoing network traffic data to the associated enterprise network within the multi-gateway enterprise networks using a corresponding User Datagram Protocol (UDP) socket based on at least one of: the routing data and the one or more encryption keys.

20. The non-transitory computer-readable storage medium of claim 15, wherein the tunnel proxy subsystem comprises an ingress processing module, the ingress processing module configured map the incoming network traffic data from the multi-gateway enterprise networks to the virtual private network (VPN) profile of the associated user within the one or more users based on at least one of: the corresponding User Datagram Protocol (UDP) socket associated with the associated enterprise network within the multi-gateway enterprise networks, and the User Datagram Protocol (UDP) encapsulation Security Parameter Index (SPID) protocol header fields.

* * * * *